United States Patent [19]

Blake

[11] Patent Number: 5,154,446
[45] Date of Patent: Oct. 13, 1992

[54] SHOULDER BELT ADJUSTMENT DEVICE FOR SEAT BELT SYSTEMS

[76] Inventor: Darlene Blake, 2301 Glenwood Dr., Des Moines, Iowa 50321

[21] Appl. No.: 560,852

[22] Filed: Jul. 27, 1990

[51] Int. Cl.[5] .............................................. B60R 22/10
[52] U.S. Cl. ..................................... 280/808; 297/483
[58] Field of Search .................. 280/801, 807, 808; 297/468, 482, 483; 24/455, 530, 545, 546, 563, 570, 907

[56] References Cited

U.S. PATENT DOCUMENTS

| | | | |
|---|---|---|---|
| 1,458,797 | 6/1923 | Beale | 24/546 |
| 2,551,019 | 5/1951 | Pierre | 24/546 |
| 3,023,468 | 3/1962 | Hord et al. | 24/546 |
| 3,713,693 | 1/1973 | Cadiou | 280/808 X |
| 4,262,933 | 4/1981 | Fox | 280/808 X |
| 4,786,078 | 11/1988 | Schreier et al. | 280/808 |
| 4,796,919 | 1/1989 | Linden | 280/808 |
| 4,832,367 | 5/1989 | Lisenby | 280/808 |

FOREIGN PATENT DOCUMENTS 436715  4/1912  France .................. 24/455
W088/04622  6/1988  World Int. Prop. O. .......... 280/801

*Primary Examiner*—Charles A. Marmor
*Assistant Examiner*—Tamara L. Finlay
*Attorney, Agent, or Firm*—Kent A. Herink; Brian J. Laurenzo

[57] ABSTRACT

A clip for use with three-point seat belt systems to permit adjustment of the diagonal or shoulder belt component to accommodate relatively short passengers. The clip is substantially S-shaped in transverse cross section including a forward face, a rearward face, and an intermediate web section interconnected therebetween. Between the forward face and the web section is a shoulder belt receiving section and between the rearward face and the web section is a lap belt receiving section. In use, portions of the lap belt and shoulder belt are received within the respective belt receiving sections of the clip. By movement of the clip relative to the belts, the lower attachment point of the shoulder belt is selectively adjustable by the passenger to permit limited adjustment of the shouldeer belt to a more comfortable and effective position.

1 Claim, 2 Drawing Sheets

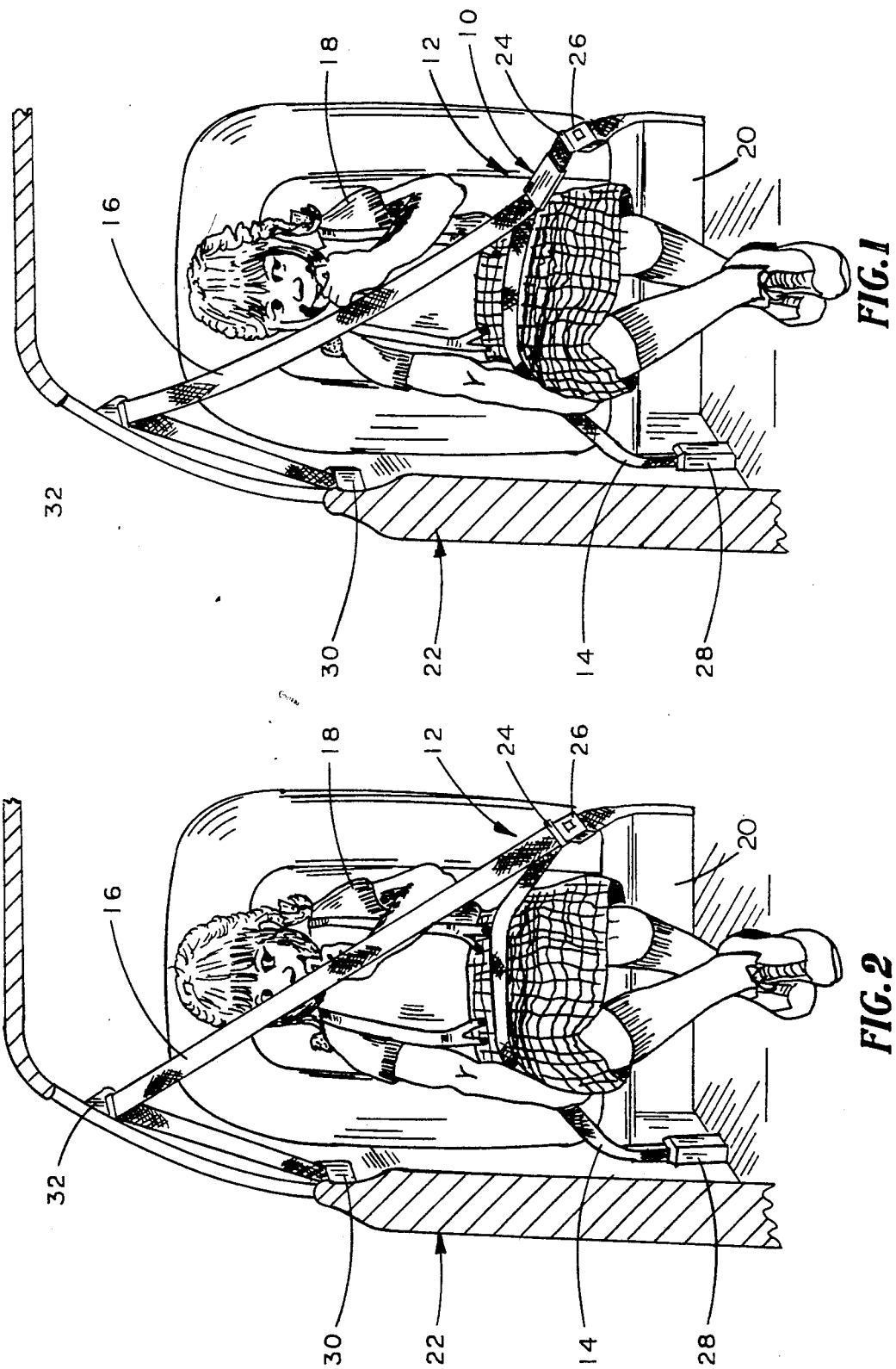

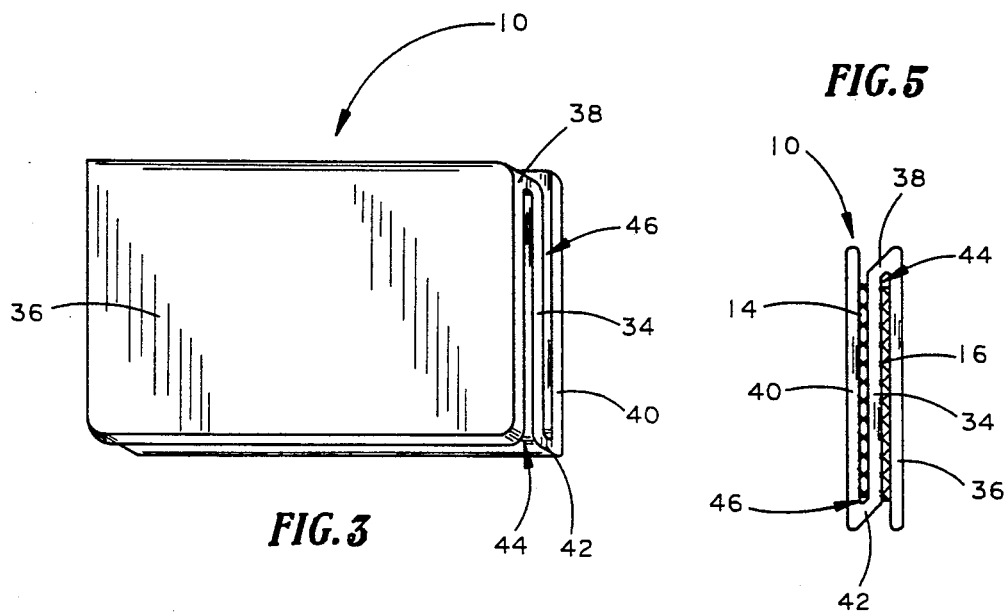
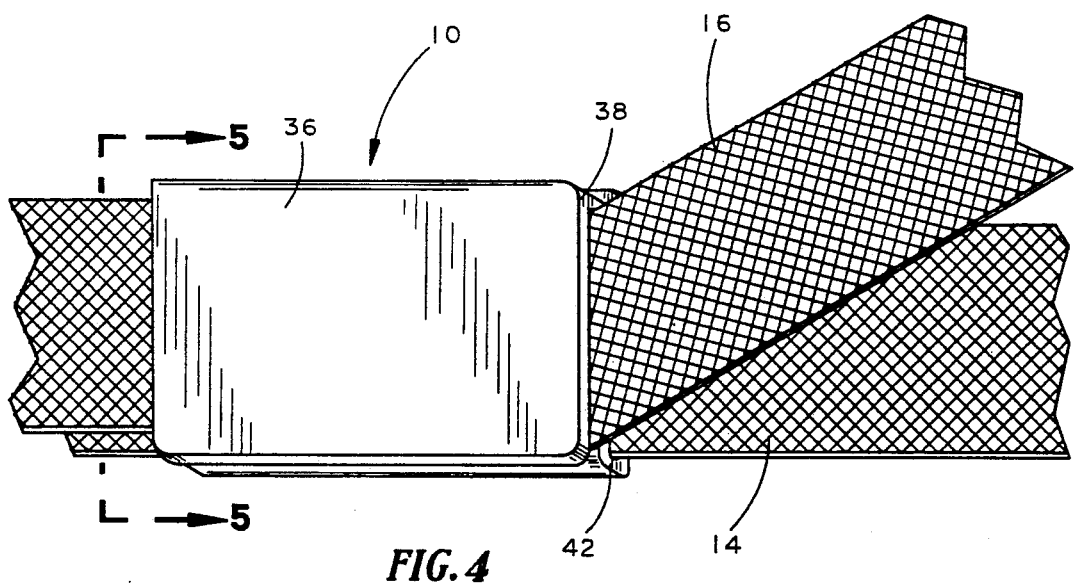

SHOULDER BELT ADJUSTMENT DEVICE FOR SEAT BELT SYSTEMS

BACKGROUND OF THE INVENTION

The invention relates to seat belt systems and, more particularly, to a device for adjusting the shoulder belt or harness of a seat belt system.

Modern seat belt systems typically include a lap belt which, in use, extends across the lap or hips of a vehicle passenger. In combination with the lap belt, a shoulder belt or harness extends from one end of the lap belt diagonally across the torso of the passenger to a securement location at its upper end on a side wall of the vehicle. At the common junction of the lap belt and shoulder belt a buckle is provided for releasable securement of the belts to create a three-point seat belt system.

The two securement points of the diagonal belt element are fixed, one at the releasable buckle and the other at a retractor or take-up device. Accordingly, the position of the diagonal belt element relative to the passenger varies with the size of the passenger. The retractor is located sufficiently high to permit effective use of the diagonal belt element for relatively tall passengers. As a result, when relatively short passengers, including children or small adults, use the three-point seat belt system, the shoulder belt will be uncomfortably high on the passenger, possibly in contact with the neck of the passenger or, in extreme cases, across the face of the passenger.

The present invention provides for adjustment of the point of contact between the shoulder belt and the lap belt, to permit limited individualized adjustment of the position of diagonal belt across the torso of the passenger. The adjustment devise is simple to manufacture and use and which can be readily used with existing three-point seat belt systems.

SUMMARY OF THE INVENTION

The invention consists of a wide, thin clip which is substantially S-shaped in transverse cross section, including a lap belt receiving section and a shoulder belt receiving section. In use with a three-point seat belt system including a lap belt and a shoulder belt, a portion of the lap belt is inserted into the lap belt receiving section of the clip and a portion of the shoulder belt is received in the shoulder receiving section of the clip. The clip holds the portions of the lap belt and shoulder belt in substantially adjacent positions thereby creating a common juncture of the lap belt and shoulder belt at the position of the clip. The clip is slidably moveable along both the lap belt and the shoulder belt toward and away from a releasable buckle which otherwise acts as the common juncture of the two belts. By adjusting the juncture point of the lap and shoulder belts, the position of the shoulder belt relative to the passenger is also adjusted. In general, the farther away from the releasable buckle that the clip is located, the shorter the passenger that can be comfortably accommodated and effectively restrained by the shoulder belt.

The clip is made of any suitably strong and lightweight material, preferably plastic or vinyl coated steel or aluminum. The inner surfaces of the belt receiving sections may be textured to increase the resistance to sliding of the belts within the clip to more affirmatively hold the clip in its desired location in use.

BRIEF DESCRIPTION OF THE DRAWINGS

FIG. 1 is an elevational view of a child seated in a vehicle having a three-point seat belt system in which the adjustment device of the present invention is used to adjust the position of the shoulder belt relative to the child;

FIG. 2 is an elevational view corresponding to FIG. 1 and illustrating the prior art wherein the shoulder belt is in the uncomfortable and less effective position across the face of the child;

FIG. 3 is a perspective view of the adjustment device;

FIG. 4 is an enlarged detail view of the adjustment device attached to the lap belt and shoulder belt of a three-point seat belt system; and FIG. 5 is a cross-sectional view of the adjustment device taken along the line 5—5 of FIG. 4.

DETAILED DESCRIPTION OF A PREFERRED EMBODIMENT

Referring to FIG. 1 there is illustrated the adjustment device or clip 10 attached to a typical three-point seat belt system, indicated generally at 12, including a lap belt 14 and a shoulder belt 16. The seat belt system 12 secures a child passenger 18 who is seated on a seat 20 of a vehicle 22.

A prior art three-point seat belt system is illustrated in FIG. 2 wherein the clip 10 of the present invention has not been used. In the absence of the clip 10, the lap belt 14 and shoulder belt 16 meet at a latch 24 which is insertable for releasable securement inside a buckle 26 that is fixedly secured to the vehicle 22. When not in use, the lap belt 14 and shoulder belt 16 are retracted into their respective take-up and feed-out mechanisms or retractors 28 and 30. In the particular arrangement illustrated in FIGS. 1 and 2, the shoulder belt 16 also passes through an upper guide member 32 which defines a fixed upper end point of the shoulder belt 16 relative to the passenger 18. Of course, in the prior art three-point belt system 12 illustrated in FIG. 2, the other end of the shoulder belt 16 is fixed at the latch 24 and buckle 26. With both end points of the shoulder belt fixed, the position of the shoulder belt is unadjustable with the result that it can comfortably and safely accommodate only a limited range of passengers of diverse height.

The clip 10 is relatively wide and flat and has a substantially S-shaped transverse cross section (FIG. 3). The S-shaped clip 10 includes a central web portion 34, a front section or plate 36 that is parallel to and spaced a small distance forwardly of the web section 34 to which it is interconnected across its upper edge by an upper leg section 38, and a rearward face 40 that is parallel to and spaced a small distance rearwardly of the web section 34 to which it is interconnected at the lower edges thereof by a lower leg section 42. The space between the forward face 36 and the web section 34 defines a shoulder belt receiving section 44 and the space between the bottom face 40 and the web section 34 defines a lap belt receiving section 46.

In use, a portion of the shoulder belt 16 is slidably received inside the shoulder belt receiving section 44 and a portion of the lap belt 14 is slidably received inside the lap belt receiving section 46 (FIGS. 4 and 5). As best illustrated in FIG. 5, the belt receiving sections 44 and 46 are of a thickness to closely accommodate the belts 14 and 16, respectively, to permit both easy insertion therein of the belts 14 and 16 and sliding of the clip 10 relative to the belts 14 and 16. The close spacing provides, however, sufficient friction such that when there is tension on the belts 14 and 16, as during normal use, the clip 10 will remain substantially in the position selected by the passenger. The resistance to movement of the clip during use can be further increased by texturing the inner surfaces of the belt receiving sections 44 and 46 so as to increase the amount of force necessary to slide the clip 10 relative to the belts 14 and 16.

It will be noted that, as illustrated in FIGS. 1 and 4, the tension in the shoulder belt 16 has a vertical component which will act to keep the shoulder belt 16 inside the shoulder belt receiving section 44 of the clip 10. Moreover, the relative tension between the shoulder belt 16 and the lap belt 14 will further act to keep the lap belt 14 inside the lap belt receiving section 46 of the clip 10. In addition, the greater the tension between the shoulder belt 16 and the lap belt 14, the more resistance the clip 10 has to movement relative to the belts 14 and 16.

Adjustment of the clip 10 is easily accomplished by a slight downward tug on the shoulder belt 16 to remove a small length from the retractor 30 and thereby release the tension between the lap belt 14 and the shoulder 16. Upon reaching the appropriate position of the clip 10, release of the shoulder belt 16 will result in tension being applied by the retractor 30 which will act to maintain the selected position of the clip 10 relative to the belts 14 and 16.

The clip 10 may be constructed of any suitable lightweight and strong material. In the preferred embodiment, a plastic coated spring steel is used. The steel gives the necessary strength to the clip 10 while the plastic coating provides additional friction to help prevent undesired movement of the clip 10 away from its selected position during use. The plastic coating of the clip 10 also acts to prevent the clip 10 from being excessively hot or cold to the touch and to give it a less hard feel.

The clip 10 is adaptable for use with any three-point seat belt system. Some three-point seat belt systems, for example, do not have an upper guide member 32 but instead locate the shoulder belt retractor 30 at the position of the upper guide member 32. The clip 10 will function identically with such systems. In another variation of three-point seat belt systems, the lap belt and shoulder belt are portions of a continuous run of belting wherein the latch slides along the belting. The clip 10 will function identically with such continuous belting three-point seat belt systems as well.

It will be evident that the embodiment specifically described herein may be modified by those skilled in the art on the basis of the present disclosure without departing from the present inventive concepts. The present invention is thus to be regarded as including each and every novel feature and combination of novel features herein disclosed and is limited solely by the spirit and scope of the following claims.

I claim:

1. A clip for adjusting a three-point seat belt system that includes a lap belt and a diagonal shoulder belt, comprising:
   (a) a forward face;
   (b) a rearward face substantially parallel to said forward face;
   (c) an intermediate web section substantially parallel to and interconnecting said forward and rearward faces along an upper edge of said forward face and along a lower edge of said rearward face such that the clip is substantially S-shaped in transverse cross-section;
   (d) a lap belt receiving section between said rearward face and said web section for receiving therein a portion of the lap belt;
   (e) a shoulder belt receiving section between said forward face and said web section for receiving therein a portion of the shoulder belt; and
   (f) wherein sliding movement of the belts in said belt receiving sections adjusts the shoulder belt.

* * * * *